Feb. 9, 1937. G. P. JACKSON ET AL 2,069,834
SLAGGING BOILER FURNACE
Filed March 12, 1934 4 Sheets-Sheet 4
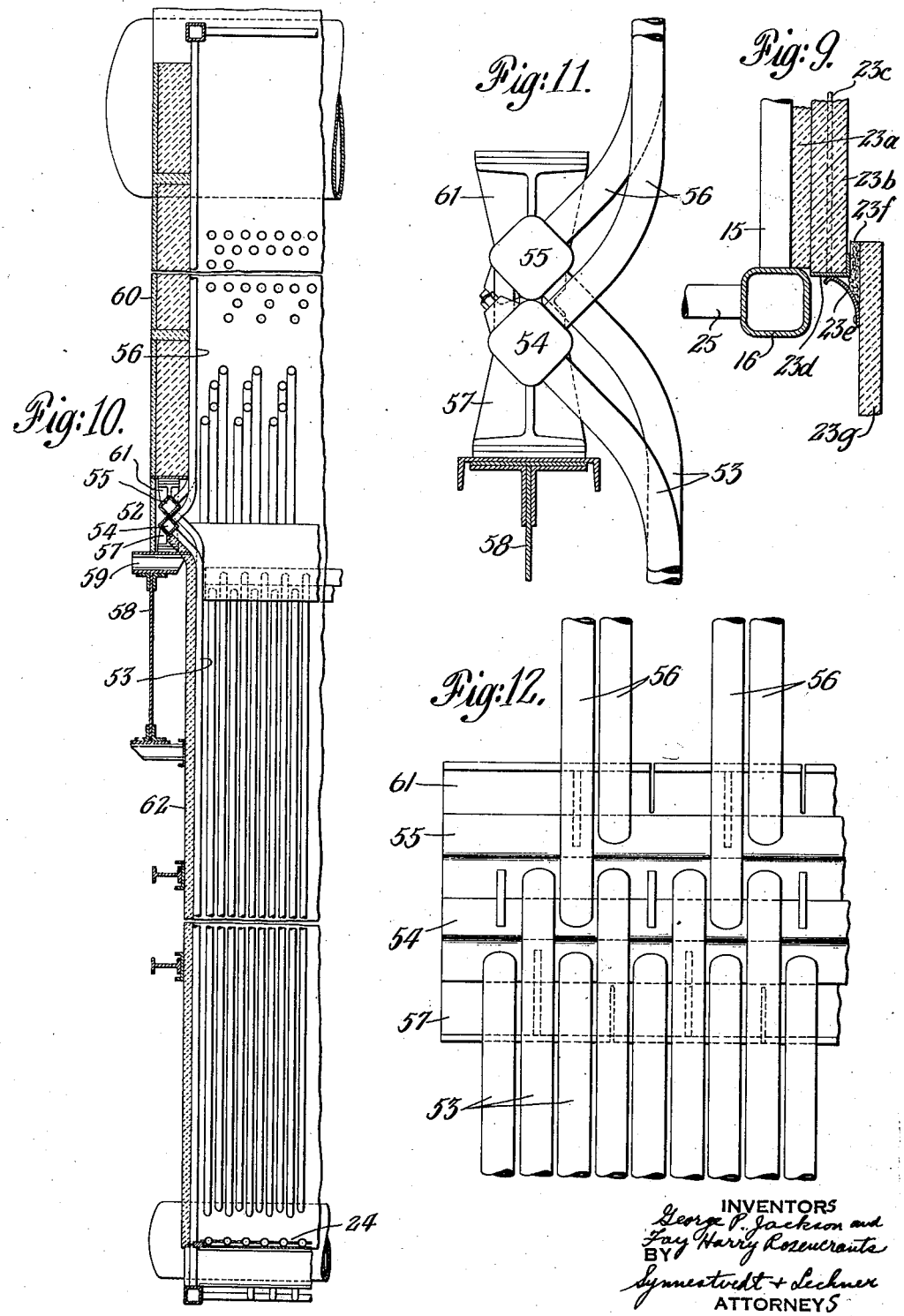

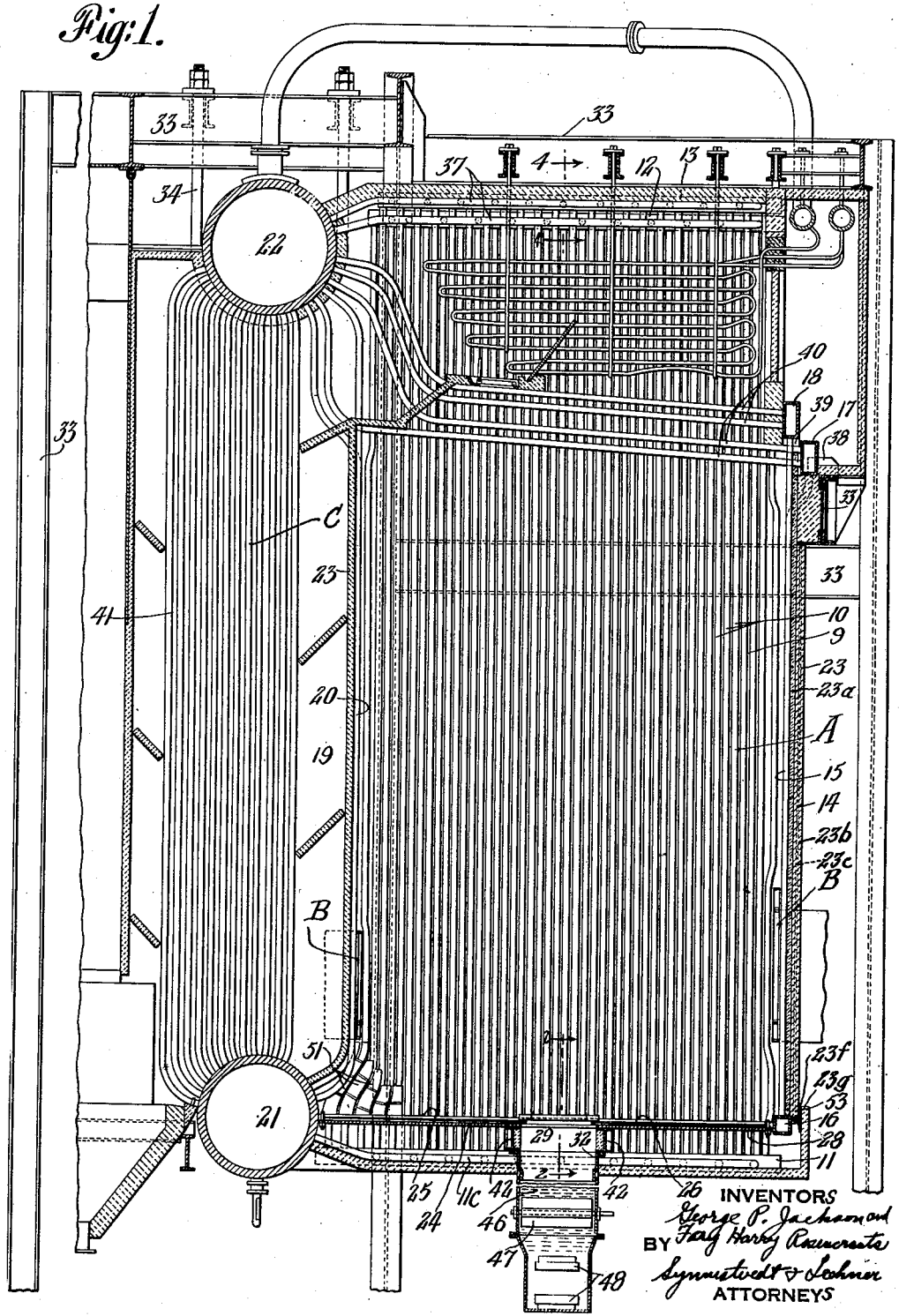

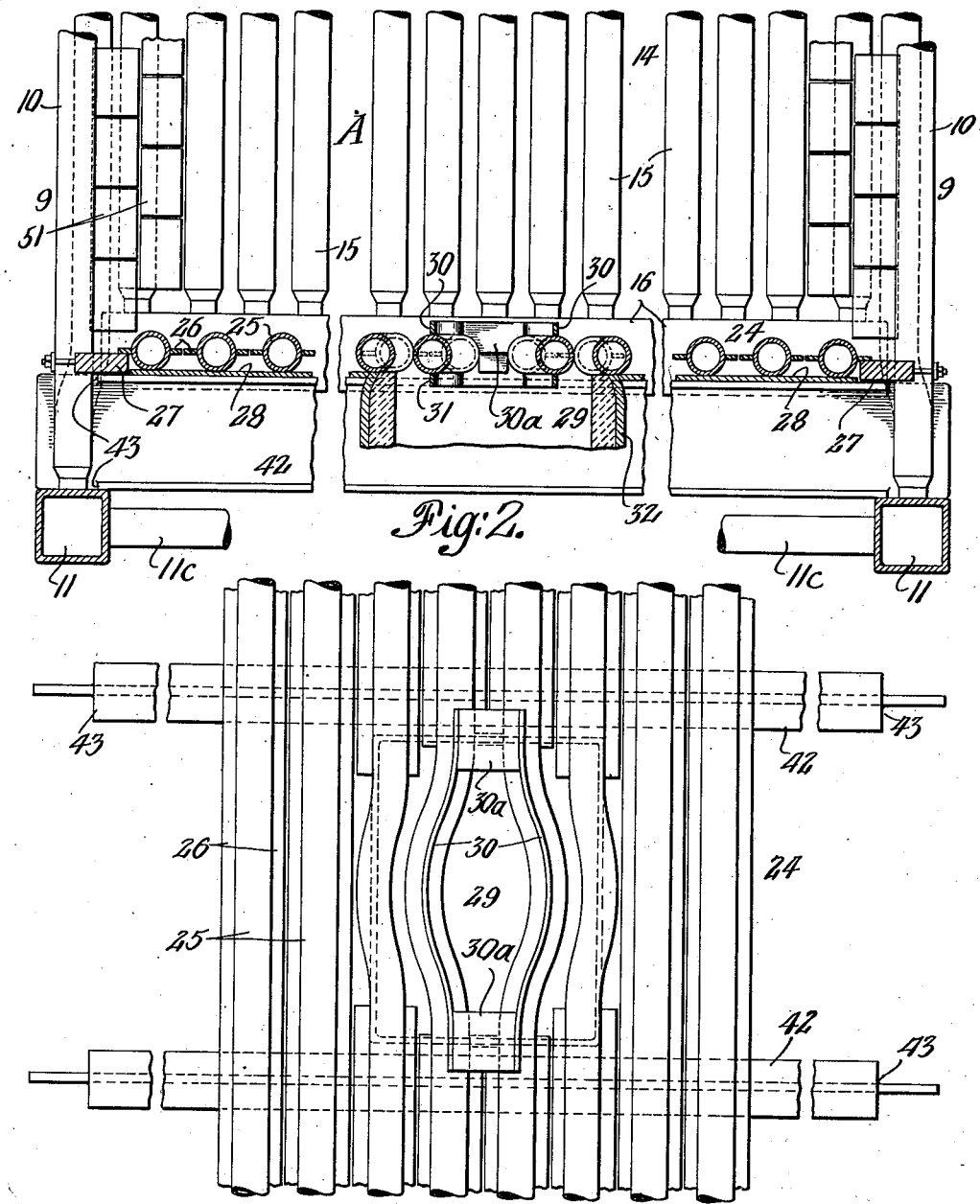

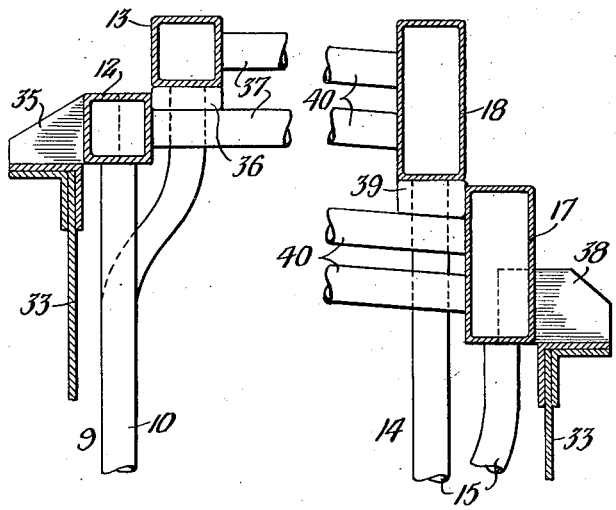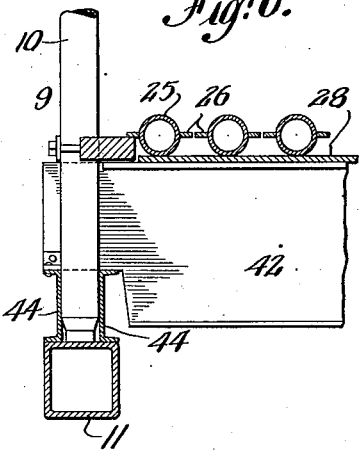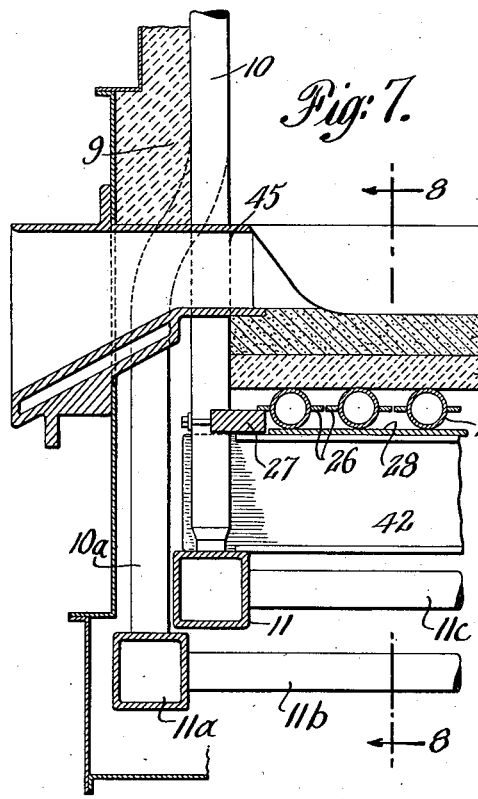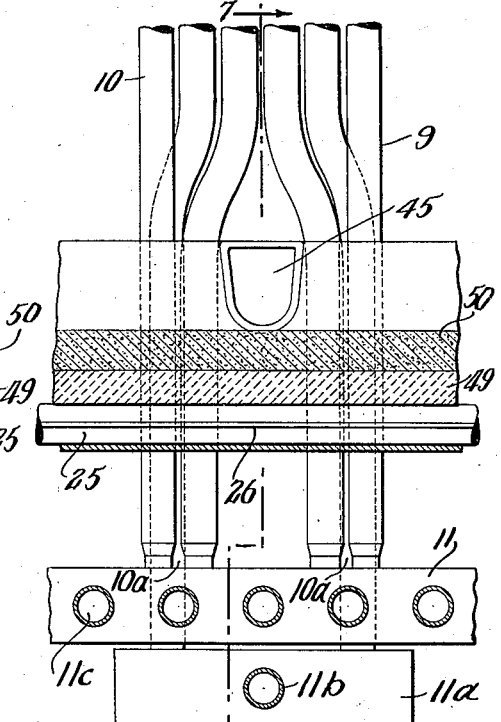

Patented Feb. 9, 1937

2,069,834

UNITED STATES PATENT OFFICE 2,069,834

SLAGGING BOILER FURNACE

George P. Jackson, Flushing, and Fay Harry Rosencrants, Scarsdale, N. Y., assignors to Combustion Engineering Company, Inc., New York, N. Y., a corporation of Delaware Application March 12, 1934, Serial No. 715,096

31 Claims. (Cl. 122—235)

This invention relates to boiler-furnaces fired with a slag producing fuel such as pulverized coal, and known as slagging or wet bottom furnaces in which the ash particles falling out of the flame are maintained in a molten state and run out of the furnace in a fluid state.

We are aware that slagging furnaces have heretofore been provided with bottoms adapted to retain a stagnant bed of molten slag and that removal of slag therefrom in a fluid state has been contemplated.

We propose a simple and effective arrangement of the slag retaining bottom in which the bottom is carried by or supported through suspended upright walls of the boiler-furnace so as to move therewith as the latter expand and contract and in which provision is also made for expansion and contraction of the bottom itself. This arrangement avoids the complications and difficulties encountered where the slag retaining bottom is separate from the remaining portions of the furnace, which have relative movement with respect thereto.

Our arrangement also is such that it may be effectively used even in installations of very large dimension in horizontal cross section.

We have also provided a bottom arrangement including an outlet or overflow means for the molten slag which maintains its same relation with the bottom under all conditions of expansion and contraction, and especially those which occur in a vertical direction.

Our arrangement is also one which is calculated to maintain a molten but nevertheless shallow bed of slag whereby the bottom may be carried by or through the medium of upright water walls without subjecting the joints for the tubes to undue strains. At the same time, the arrangement is such that destruction and washing out of portions of the bottom is avoided.

More specifically, an object of our invention resides in producing what may be termed a suspended slagging boiler-furnace having among other things, the advantages hereinafter appearing.

How the foregoing, together with such other objects and advantages as may hereinafter appear, or are incident to our invention, are realized, is illustrated in preferred form in the accompanying drawings, wherein:—

Fig. 1 is a sectional elevation of a furnace and boiler installation having a slagging or wet bottom furnace embodying our invention.

Fig. 2 is an enlarged fragmentary cross section taken on the line 2—2 of Fig. 1, with portions broken out to condense the figure.

Fig. 3 is a fragmentary plan view of Fig. 2 with certain of the parts omitted.

Fig. 4 is an enlarged fragmentary cross section taken substantially on the line 4—4 of Fig. 1, and illustrates the manner of suspending the side walls of the furnace.

Fig. 5 is a similar view illustrating the manner in which one of the end walls is suspended.

Fig. 6 is a fragmentary cross section similar to Fig. 2, but illustrating a modification of our invention.

Fig. 7 is a cross sectional view taken on the line 7—7 of Fig. 8, illustrating another modification of the invention.

Fig. 8 is a section taken on the line 8—8 of Fig. 7.

Fig. 9 is a fragmentary sectional view illustrating a casing detail.

Fig. 10 is a fragmentary vertical cross section illustrating a modified side wall construction.

Fig. 11 is an enlarged fragmentary view of the construction at the intermediate headers of Fig. 10; and Fig. 12 is a fragmentary face view looking toward the left in Fig. 11.

Referring to the drawings, the furnace and boiler installation illustrated comprises in general a furnace having a combustion chamber A, burner means B for introducing finely divided fuel, such as pulverized coal, and air, into the combustion chamber, and a convection bank of tubes C located at one side of the combustion chamber.

Each of the side walls 9 of the combustion chamber, is lined with upright steam evaporating tubes 10, the lower ends of which are connected into a lower header 11, and the upper ends into upper headers 12 and 13, it being noted that the tubes alternately connect into the headers 12 and 13 at the top, as clearly illustrated in Figs. 1 and 4. The end or front wall 14 is similarly lined with upright steam evaporating tubes 15 which are connected at their lower ends into a lower header 16 and at their upper ends into upper headers 17 and 18, with the tubes alternately connecting into these upper headers. (Where needed for ligament strength, tubes of the installation have reduced or swaged ends for connection.) The end or rear wall 19 is also provided with upright steam evaporating tubes 20 which are connected at their lower ends into a mud drum 21, and at their upper ends into an upper steam and water drum 22. Suitable sheathing 23 is provided for the upright walls of the furnace.

The bottom 24 of the furnace is constructed so as to retain a stagnant bed of molten slag, and as illustrated in Figs. 1, 2, and 3, comprises a plurality of relatively closely spaced horizontally disposed water tubes 25 connected at their rear ends into the drum 21, and at their front ends into the lower header 16 of the front wall 14. In this instance, the tubes 25 are provided with lateral extensions or fins 26 extending longitudinally thereof, and the spacing of the tubes is such that the fins of adjacent tubes substantially abut so as to provide a continuous metallic water cooled bottom for the combustion chamber. It will be seen from inspection of Fig. 2 that these tubes are provided for the full width of the combustion chamber, and that filler blocks 27 are provided to fill the space between the end tubes of the bottom and the tubes 10 of the side walls 9 of the combustion chamber. A metallic plate or plates 28 is or are provided as a bottom backing for the tubes, and serves to prevent slag from falling through the bottom, particularly if no fins are employed on the tubes.

In the form of our invention illustrated in Figs. 1 to 3, a central outlet 29 is provided in the bottom for the discharge of molten slag, which may be formed by bending certain of the tubes of the bottom, as clearly illustrated in Figs. 2 and 3, it being noted that the fins of the bent tubes end short of the central opening to permit of this. The tubes of the bottom which immediately surround the outlet opening 29 may be provided with vertically extending fins 30 which serve as a ledge, acting to retain the slag, so as to maintain a predetermined level of molten slag in the bottom. Similar downwardly extending fins 31 may be provided on these tubes to act as lips from which the slag drips, thereby preventing the slag from adhering to the side walls of the outlet casing 32, which is associated with the slag outlet. End filler members 30a are associated with the fins 30 to complete the ledge around the outlet 29.

In order to avoid difficulties due to expansion and contraction of the furnace walls, and to avoid the complicated construction which would otherwise be required, the bottom 24 is entirely supported from the walls of the boiler-furnace, and the walls are suspended from associated structural work, as will now appear.

Suitable structural work 33 is included in the installation, from which the boiler-furnace is suspended. The steam and water drum 22 is suspended by means of straps 34. The side walls (see Fig. 4) are suspended by means of plates 35 secured to the upper headers 12 and resting on the structural work 33, and by means of blocks 36 located between and in contact with the upper headers 13 and the lower set of tubes 37 which lead steam from the side walls into the steam and water drum 22. The end or front wall 14 (see Fig. 5) is suspended by means of plates 38 secured to the upper headers 17 and resting on the structural work 33 and blocks 39 located between and in contact with the upper headers 18 and the lower set of tubes 40 which lead steam from the front wall to the steam and water drum 22. The end or rear wall 19 is suspended by reason of the tubes 20 being connected into the suspended steam and water drum 22.

Since the cooling tubes 25 of the bottom are connected into the drum 21 which is suspended because of its connection to the suspended drum 22 by the tubes 41 of the convection bank C and the wall tubes 20, and since they are also connected into the lower header 16 of the suspended tubes 15 of the front wall, it will be seen that these bottom tubes receive support from the front and rear walls. Additional support for these bottom tubes is provided by means of a plurality of relatively light I beams 42 extending crosswise of the combustion chamber and resting at their end portions on the lower headers 11 of the side walls (see particularly Fig. 2). The tubes 25 of the bottom rest on the top of these I beams or, when the backing plate 28 is used, the backing plate rests on the I beams, and the I beams in turn rest on the headers 11, it being noted that the end portions of the flanges of the I beams are cut away, as indicated at 43 in Figs. 2, 3, 6 and 7, to permit the webs to pass in between the tubes of the side walls. Any number of these I beams may be employed, as conditions require. In some instances, reinforcing members or channel irons 44 may be located between the I beams 42 and the headers 11, as illustrated in Fig. 6.

It will be seen that by the foregoing arrangement, the bottom as a whole is a reinforced construction which will not sag under its loads, even if the horizontal cross sectional dimensions of the combustion space are large.

By hanging or suspending the walls of the boiler-furnace from the top and by supporting the bottom from these hung walls, the bottom will move with the walls as expansion and contraction thereof take place, so that complications which have been heretofore encountered in slagging furnaces are overcome.

As to expansion of the bottom tubes away from the drum 21, the header 16 is free to move with the bottom tubes 25 as they expand away from or contract toward the drum 21, it being pointed out that a backing 23b of flexible material such as rock wool, is associated with the tiles 23a located at the back of the tubes 15. This backing may be supported by a rod or rods 23c depending from the structural work 33. At the bottom of the backing 23b, a supporting plate 23d hung from the rod 23c is employed (see Fig. 3) and a yieldable sealing plate 23e is associated therewith. Flexible packing material is provided at 23f between the lower portion of the backing 23b and the lower sheathing 23g.

As to expansion and contraction of the slag bed, no undue strains are placed upon the walls and the various joints. In operation, the refuse particles deposit on the bottom and in the corners and do not become molten because of the cooling effect of all of the tubes until the deposit is of such a depth that the cooling effect of the tubes is insufficient to prevent further deposit from becoming molten. Since the temperatures are lowest at the periphery, the peripheral portion of the bed builds up appreciably higher than the vertical portions before the particles will melt and coalesce. The molten portion of the bed therefore thins out at the periphery and curves upwardly. Because of this and the material amount of substantially uncoalesced particles in the corners, no appreciable strain is placed on the tubes and joints as the bed expands on re-starting after shut-down. In this connection, after shut-down, the molten portion of the bed frequently cracks and when starting up, the cracks are filled with fresh deposit, with the result that the slag of the bed tends to assume larger horizontal dimensions.

Furthermore, any difficulties in the above respect are minimized because the bed at no time assumes substantial depth by reason of the fact that there is continual discharge of slag in operation once the depth of the bed is such that discharge can take place. In this regard, we prefer, in instances when the ledge 30 is employed at the discharge opening, to make the ledge extend upwardly to about the point where the cooling effect of the tubes is insufficient to prevent melting so that the total depth of the bed is kept to a minimum.

In further explanation of the above, it is pointed out that the tap or overflow opening located at or near the center of the furnace, lends itself particularly to corner or tangential firing, such as illustrated in Fig. 1, in which case the hottest zone will be just above the overflow, even at low loads when but two opposite corner burners may be in use. It is advantageous to direct the burners downwardly toward the bed in such corner firing.

By having the slag tap located in the furnace bottom below the zone of the hottest temperature of the flame, at low as well as high rates of combustion, a fluid molten state of slag exists around the tap over a relatively wide range of loads, and this permits of the practically continuous tapping of the slag bed. The depth and weight of the slag bed may thus be maintained at the desired point, and, as above indicated, it is preferable to maintain a relatively thin bed of slag in the bottom.

In some furnace designs, it may be desirable to have the slag tap located in the furnace side wall or walls 9, as indicated in Figs. 7 and 8 at 45. In such cases the firing may not be corner firing as described above, but may be directed through one wall, with the slag tap hole so located as to be below the zone of hottest temperature for example, at the end of a row of several burners, where flame impingement may occur at various ratings of combustion. A fluid molten state of the slag will then exist around the tap hole over a relatively wide range of loads and permits practically continuous tapping of the slag bed.

It will be seen from the foregoing that we have provided a light bottom construction comprising water tubes, a relatively thin chilled layer of slag directly thereover which is impervious to slag leaks, a relatively shallow pool of molten slag, and overflow means for the excess molten slag.

We prefer to employ the water cooled floor with practically no coverage of refractory material other than the fused slag which under continuous tapping can be reduced down to a matter of one inch or so. Because the cooling tubes have the effect of cooling the molten slag which comes in direct contact therewith and thus form a covering of fused slag thereover, washing away of the floor, and particularly the portions thereof located peripherally of the overflow opening, is avoided. It is to be understood that because of the cooling effect of the cooling tubes on the slag we contemplate employing an overflow opening in some instances, with which no ledge such as the fins 30 is associated.

While the foregoing is the preferred practice when employing a central discharge, or arrangement of suspended bottom is nevertheless capable of sustaining the load of relatively deep beds such as would occur in installations where the slag is only intermittently tapped.

The slag flowing from the overflow drops into the casing 32 and into the water bath 46 which breaks it into small particles. A crusher feeder such as a pair of power driven crusher rollers or toothed wheels 47, are submerged in the bath and the crushed slag is delivered therefrom to a drag conveyor, diagrammatically indicated at 48, which in turn removes it to any desired point of disposal (see Fig. 1). This discharging and conveying apparatus serves to maintain a continuity of slag flow from the furnace. To permit the discharge throat to move with the bottom, it is arranged to have telescopic relation with the boot leading to the conveyor.

In the modification of Figs. 7 and 8, we have illustrated the side slag tap opening 45, above referred to, and have additionally indicated a top lining associated with the bottom cooling tubes 25, which lining may be composed of a layer of ordinary refractory material 49 and a layer 50, of dolomite or similar material of cup shaped form. It is to be understood, however, that the side slag tap opening 45 may be employed with an unlined water cooled bottom such as shown in Fig. 1.

The tubes in the region of the tap opening 45 are suitably bent in order to provide space for the tap, two of the tubes 10a being bent rearwardly and connected into a separate lower header 11a, to which water is led from the water drum 21 by means of a pipe 11b similar to the tubes 11c which lead water from said drum to the headers 11.

It is desirable, where possible, to reduce the cross sectional area of the furnace, i. e., to have a furnace of smaller cross sectional dimension for a given capacity of steam per hour than is ordinarily necessary. This further reduces the weight of the bottom. Such a reduction in cross sectional area has an advantageous effect in furnace performance which will be better understood by first reciting the action in a furnace of the usual dry bottom type. In dry bottom furnaces where either a water cooled slag screen or water cooled bottom is used to congeal the ash particles, the radiant heat absorption of the bottom aids materially in cooling the flame, which reduces the temperature of the gas leaving the furnace and entering the boiler tube bank. In such furnaces, it is possible when using bare tube water cooled walls and bottom, to reduce the temperature of the gas leaving the furnace near to or below the fusing temperature of the ash, even at relatively high ratings, thereby greatly aiding in minimizing the difficulties encountered from ash adhering to tubes of the boiler. When slagging bottoms are employed, this cooling effect of the bottom on furnace temperature is lost, and consequently higher temperatures of the gas leaving the furnace will result. However, a tall furnace of the same volume as that of a shorter furnace, will have more upright wall surface than the shorter furnace, so that the cooling surface lost in a slagging bottom is in part reclaimed in the greater wall surface.

Referring to the boiler circulation, water is led from the drum 21 through the bottom tubes 25 to the header 16, then upwardly through the tubes 15 which are connected to deliver steam generated therein into the drum 22 through the medium of the upcomer tubes 40 extending across the upper portion of the combustion chamber. In order to avoid sluggish circulation in the horizontal bottom tubes 25 the front wall tubes 15 are connected into a plurality of upper headers 17 and 18 each having a plurality of upcomer tubes 40 leading therefrom to the drum 22. Through this arrangement, a strong pull is created on the bottom tubes 25, with the result that very effective circulation is ensured.

With respect to the tubes 10 of the side walls 9, water is led thereto from the drum 21 by means of the tubes 11c, and the steam generated therein is led to the drum 22 by means of the top tubes 37 which connect the pairs of upper headers 12 and 13 with the drum 22.

Circulation through the tubes 20 of the rear wall 19 is from the drum 21 upwardly to the drum 22.

Water is returned from the steam and water drum 22 to the mud drum 21 through tubes of the convection bank C.

The upper headers 17 and 18 of the front wall 14 may be mounted to permit the tubes 40 to expand, and the bends in the tubes themselves, and the arrangement of the sheathing also aid in this respect.

It should be observed that metallic blocks 51 (see Figs. 1 and 2) are carried by certain of the tubes at the corners, in order to provide sufficient cooling thereat and sealing of the intertube space.

In the modified side wall construction illustrated in Figs. 10 to 12, the wall is supported intermediate of its top and bottom as indicated at 52. The wall tubes 53 are alternately connected at their upper ends into headers 54 and 55 which are superimposed and secured together as by means of welding. A plurality of other wall tubes 56 are alternately connected at their lower ends into the headers 54 and 55 and lead therefrom to the steam and water drum of the boiler.

The headers and the tubes receive their support from structural work associated with the boiler through the medium of a member or members 57 secured to the lower header of the pair and a girder 58. Members 59 may be employed between the member 57 and girder 58 as shown in Fig. 10. The upper wall structure 60 rests on a member or members 61 secured to the upper header of the pair so that the load is taken by the girder 58. The sheathing 62 of the tubes 53 is carried by the tubes by means of suitable buckstays. It will thus be seen that a unitary rigid structure is provided in which the desired stiffness for the headers is obtained, and which is not subjected to bending, all of the load being taken by the girder 58. The slag retaining bottom 24 is supported from the tubular wall in a manner similar to that described above. It will be seen from the foregoing that I have provided a water wall arrangement in which the wall is divided into an upper and a lower section, one above the other, and connected by headers having means associated therewith to provide support for the sections.

While the invention has been described in a boiler-furnace having a bank of upright convection tubes at one side, it is to be understood that we contemplate applying the invention to installations having convection boilers of various arrangement, such for example as horizontal tube cross drum boilers. Also certain advantages of the invention may be realized in furnaces other than those of the slagging or wet bottom type.

We claim:

1. In a pulverized fuel fired boiler-furnace, the combination of a combustion chamber having side and end walls each comprising a set of upright water tubes, the tubes of one of the end walls being connected at their lower ends into a water drum and at their upper ends into a steam and water drum and the tubes of the other end wall and of the side walls being connected at their lower and upper ends into lower and upper headers respectively, a bottom for said chamber comprising water tubes connected at one end into said water drum and at the other end into the lower header of the second mentioned end wall, said bottom tubes having means associated therewith adapting the bottom to retain a body of liquid slag, means providing support for said bottom from the lower headers of the side walls, and means for introducing pulverized fuel and air into said combustion chamber.

2. A pulverized fuel fired boiler-furnace having suspended upright walls each comprising steam evaporating tubes and water compartments into which the lower ends of the tubes are connected and a slag retaining bottom for the furnace comprising water tubes connected at their ends into the water compartments of two opposite walls, and means providing support for said bottom from the water compartments of the two other opposite walls of the furnace.

3. A pulverized fuel fired boiler-furnace having suspended upright walls each comprising steam evaporating tubes and water compartments into which the lower ends of the tubes are connected and a slag retaining bottom for the furnace comprising water tubes connected at their ends into the water compartments of two opposite walls, and beams extending crosswise of said bottom tubes for supporting said tubes, said beams being supported from the water compartments of the two other opposite walls of the furnace.

4. A pulverized fuel fired furnace having a bottom for receiving and carrying in a bed the molten slag precipitating during operation, structural work, and steam evaporating tubes supported from said structural work arranged at the walls of the furnace in surrounding relation to said bottom, and supporting means for said bottom comprising supports carried by the tubes of opposite side walls at their lower portions and beams resting on said supports.

5. A pulverized fuel fired furnace having suspended upright walls each comprising steam evaporating tubes and water compartments into which the lower end of the tubes are connected, a slag retaining bottom for the furnace, comprising water tubes connected at their ends into the water compartments of two opposite side walls, beams extending crosswise of and supporting said bottom tubes, said beams receiving their support from the water compartments of the two other opposite walls of the furnace, and reinforcing means between said beams and said last mentioned water compartments.

6. In a pulverized fuel fired boiler-furnace, the combination of a combustion chamber having its upright walls comprised of sets of upright steam evaporating tubes supported at their upper portions with freedom for expansion downwardly, a slag retaining bottom for said chamber supported from the lower portion of said sets of tubes to move with the tubes as expansion and contraction of the tubes take place, said bottom comprising spaced water tubes and means associated therewith to prevent slag from falling through the spaces between tubes, overflow means positioned to maintain the liquid slag retained by the bottom at a predetermined level, and means for introducing pulverized fuel and air into said chamber.

7. In a pulverized fuel fired boiler-furnace, the combination of a combustion chamber having its upright walls comprised of sets of upright steam evaporating tubes supported at their upper portions with freedom for expansion downwardly, a slag retaining bottom for said chamber supported from the lower portion of said sets of tubes to move with the tubes as expansion and contraction of the tubes take place, said bottom comprising finned water tubes so spaced apart that the fins of adjacent tubes substantially abut, whereby a substantially continuous metallic bottom is provided, overflow means positioned to maintain a shallow body of liquid slag in said bottom, and means for introducing pulverized fuel and air into said chamber.

8. In a pulverized fuel fired boiler-furnace, the combination of a combustion chamber having its upright walls comprised of sets of upright steam evaporating tubes supported at their upper portions with freedom for expansion downwardly, a slag retaining bottom for said chamber supported from the lower portion of said sets of tubes to move with the tubes as expansion and contraction of the tubes take place, said bottom comprising horizontally disposed water tubes certain of which are bent to provide a liquid slag outlet centrally of said bottom, and means at said outlet for maintaining the liquid slag retained by said bottom at a predetermined level.

9. In a pulverized fuel fired boiler-furnace, the combination of a combustion chamber having its upright walls comprised of sets of upright steam evaporating tubes supported at their upper portions with freedom for expansion downwardly, a slag retaining bottom for said chamber supported from the lower portion of said sets of tubes to move with the tubes as expansion and contraction of the tubes take place, said bottom comprising horizontally disposed cooling members, certain of which at the central portion of the bottom, are bent to provide a central peripherally cooled opening in the bottom for the discharge of liquid slag.

10. In a pulverized fuel fired furnace, the combination of structural work, upright walls for the furnace suspended from said structural work, and a bottom for the furnace for receiving and carrying in a bed the molten slag precipitating during operation, said bottom being supported from said walls and having centrally located overflow means for maintaining the slag in the furnace at a predetermined level.

11. In a pulverized fuel fired furnace, the combination of structural work, upright walls for the furnace suspended from said structural work, and a slag retaining bottom for the furnace, comprising horizontally disposed cooling members supported from said walls, certain of which are bent to provide a central peripherally cooled outlet for the discharge of liquid slag.

12. In a pulverized fuel fired furnace, the combination of structural work, upright walls for the furnace suspended from said structural work, and a slag retaining bottom for the furnace, comprising horizontally disposed cooling members supported from said walls, certain of which are bent to provide a central peripherally cooled outlet for the discharge of liquid slag, and means located peripherally of said outlet for maintaining the retained liquid slag at a predetermined level.

13. In a pulverized fuel fired furnace, the combination of a combustion chamber, a bottom for said chamber for receiving and carrying in a bed the molten slag precipitating during operation, steam evaporating tubes arranged in surrounding relation to said bottom, structural work, means for suspending said steam evaporating tubes from said structural work, said bottom being supported from said tubes to move therewith as expansion and contraction occur, and overflow means for maintaining the liquid slag retained by said bottom at a predetermined level.

14. In a pulverized fuel fired boiler-furnace, the combination of a combustion chamber having upright walls comprising upper headers, lower headers, and upright steam evaporating tubes connecting said headers, means for suspending said upright walls including structural work associated with the boiler-furnace, and means carried by upper headers of the walls engaging said structural work, a bottom for said combustion chamber, and means for supporting said bottom from the walls, including re-inforcing members for the bottom having supporting engagement with the lower portion of the walls.

15. In a pulverized fuel fired boiler-furnace, the combination of a combustion chamber, an upper steam and water drum, a lower mud drum, upright boiler tubes connecting said drums and constituting a steam evaporating wall for the combustion chamber, lower headers, upper headers, and upright boiler tubes connecting the lower and upper headers and constituting steam evaporating walls for the combustion chamber, a bottom for said combustion chamber comprising spaced horizontally disposed water tubes connected at one end into said mud drum and at their other ends into the lower header of one of the steam evaporating walls of the combustion chamber, and means closing the spaces between said water tubes to prevent molten slag passing through the spaces and a plurality of upcomer tubes leading from the upper headers of said last mentioned wall to said upper steam and water drum.

16. In a pulverized fuel fired boiler-furnace, the combination of a combustion chamber having its upright walls comprised of upright steam evaporating tubes, a lower mud drum, an upper steam and water drum, upright steam evaporating tubes connecting said drums and constituting one of said upright walls of the combustion chamber, a lower header and a plurality of upper headers located at the wall opposite said last mentioned wall, a plurality of upright steam evaporating tubes connecting said headers and constituting another of said upright walls of the combustion chamber, a bottom for said combustion chamber, comprising spaced horizontally disposed water tubes connected at one end into said mud drum and at their other ends into said lower header, and means closing the spaces between said water tubes to prevent molten slag passing through the spaces, and a plurality of upcomer tubes leading from each of said upper headers to said steam and water drum.

17. A pulverized fuel fired boiler-furnace comprising a combustion chamber, a bottom therefor comprising horizontally disposed water tubes, means closing the spaces between said water tubes to prevent molten slag passing through the spaces, a water compartment into which one end of said tubes are connected, and a header into which the other ends of said tubes are connected, a plurality of upright steam evaporating tubes lining a wall of the combustion chamber, and connected at their lower ends into said header, a plurality of upper headers into which the upper ends of said steam evaporating tubes are connected, an upper steam and water drum, and a plurality of riser tubes connecting said upper headers for delivery into said steam and water drum.

18. A pulverized fuel fired boiler-furnace, having an upright wall comprised of upright steam evaporating tubes arranged in upper and lower sections, header means between the sections into which the tubes of the sections connect to establish communication therebetween, means associated with said header means providing support for said sections of tubes with the lower section suspended, a bottom for the boiler-furnace, and means for supporting said bottom from the lower portion of said lower section to move therewith as expansion and contraction take place.

19. A pulverized fuel fired boiler-furnace, having an upright wall comprised of upright steam evaporating tubes arranged in upper and lower sections connected together for circulation, means at the junction of the sections for supporting them with the lower section suspended, a bottom for the boiler furnace, and means for supporting said bottom from the lower portion of the lower section to move therewith as expansion and contraction take place.

20. A pulverized fuel fired boiler-furnace, having an upright wall comprised of upright steam evaporating tubes divided into an upper and a lower section, a pair of headers secured together in superimposed relation, adjacent tubes of the sections being alternately connected into the upper and lower headers, a fixed support below said headers on which the connected headers rest to support the wall sections with the lower section in suspension, a bottom for the boiler furnace, and means for supporting said bottom from the lower portion of the lower suspended section to move therewith as expansion and contraction take place.

21. A pulverized flue fired boiler-furnace, having an upright wall comprised of upright steam evaporating tubes divided into an upper and a lower section, a pair of headers secured together in superimposed relation, adjacent tubes of the sections being alternately connected into the upper and lower headers, a fixed support below said headers on which the connected headers rest to support the wall sections with the lower section in suspension, wall structure backing the tubes of the upper section and supported on said connected headers, sheathing backing the tubes of the lower section and supported thereby, a bottom for the boiler-furnace, and means for supporting said bottom from the lower portion of the lower suspended section to move therewith as expansion and contraction take place.

22. A pulverized fuel fired boiler-furnace, having an upright wall comprised of upright steam evaporating tubes arranged in upper and lower sections, header means between the sections into which the tubes of the sections connect to establish communication therebetween, a fixed support located below and supporting said header means and sections of tubes with the lower section suspended, refractory wall structure backing the tubes of the upper section, said structure receiving its support from said fixed support, sheathing backing the tubes of said lower section, a bottom for the boiler-furnace, and means for supporting said bottom from the lower portion of the lower suspended section to move therewith as expansion and contraction take place.

23. In a furnace for burning slag forming fuel, the combination of a combustion chamber; and a horizontally disposed bottom for said combustion chamber comprising spaced water tubes and means closing the spaces between tubes, said tubes being constructed and arranged to provide an opening extending downwardly through said bottom for the discharge of molten slag, and means associated with the tubes at said opening for maintaining a pool of slag on said bottom at a predetermined level.

24. A pulverized fuel fired furnace having a bottom for receiving and carrying liquid slag precipitating during operation, structural work, and steam evaporating tubes supported from said structural work arranged at the walls of the furnace in surrounding relation to said bottom, and means providing support for said bottom from opposed side walls of the furnace, said bottom having an opening extending downwardly therethrough for the discharge of liquid slag.

25. A pulverized fuel fired boiler-furnace having suspended upright walls each comprising steam evaporating tubes and water compartments into which the lower ends of the tubes are connected, and a slag retaining bottom for the furnace comprising water tubes connected at their ends into the water compartments of two opposite walls and moving with the walls as expansion and contraction of the walls take place, and means moving with the bottom for providing support for the bottom.

26. A pulverized fuel fired boiler-furnace having suspended upright walls each comprising steam evaporating tubes and water compartments into which the lower ends of the tubes are connected, and a slag retaining bottom for the furnace comprising water tubes connected at their ends into the water compartments of two opposite walls and moving with the walls as expansion and contraction of the walls take place, and beam means providing support for the bottom, said beam means being supported to move with the bottom.

27. In a slagging furnace, a substantially flat bottom having an opening extending downwardly therethrough, said bottom comprising tubular members and means associated therewith to prevent liquid slag from passing therethrough except at said opening, the tubular members at said opening cooling it, and pulverized coal burners arranged to direct coal streams into the furnace tangent to a circle to produce a vortical flame sweeping the opening the axis of which is approximately vertical and coincident with the axis of the opening.

28. In combination, a furnace, a substantially horizontally disposed bottom for the furnace having a relatively small discharge opening extending downwardly therethrough, means for introducing and burning fuel in said furnace, said burning producing slag in the furnace, and said bottom comprising water tubes, certain of which have bowed portions to provide said discharge opening, said certain tubes having upright projections at their bowed portions.

29. In combination, a furnace, a substantially horizontally disposed bottom for the furnace having a relatively small discharge opening extending downwardly therethrough, means for introducing and burning fuel in said furnace, said burning producing slag in the furnace, and said bottom comprising water tubes, certain of which have bowed portions to provide said discharge opening, said certain tubes having upright projections at their bowed portions integrally fastened thereto, and constituting an upwardly extending dam at said opening.

30. In combination, a furnace, a substantially horizontally disposed bottom for the furnace having a relatively small discharge opening extending downwardly therethrough, means for introducing and burning fuel in said furnace, said burning producing slag in the furnace, and said bottom comprising water tubes, certain of which have bowed portions to provide said discharge opening, said certain tubes having upwardly extending means in thermal contact therewith at their bowed portions.

31. In combination, a furnace, a substantially horizontally disposed bottom for the furnace having a relatively small discharge opening extending downwardly therethrough, means for introducing and burning fuel in said furnace, said burning producing slag in the furnace, and said bottom comprising water tubes, certain of which have bowed portions to provide said discharge opening, said certain tubes having upright fins secured thereto in thermal contact therewith at their bowed portions.

GEORGE P. JACKSON.
FAY HARRY ROSENCRANTS.